United States Patent
Shinozaki et al.

(10) Patent No.: US 10,739,050 B2
(45) Date of Patent: Aug. 11, 2020

(54) AIR-CONDITIONING APPARATUS

(71) Applicant: Mitsubishi Electric Corporation, Tokyo (JP)

(72) Inventors: Kazuyoshi Shinozaki, Tokyo (JP); Osamu Morimoto, Tokyo (JP); Yuji Motomura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 7 days.

(21) Appl. No.: 16/303,747

(22) PCT Filed: Aug. 8, 2016

(86) PCT No.: PCT/JP2016/073352
§ 371 (c)(1),
(2) Date: Nov. 21, 2018

(87) PCT Pub. No.: WO2018/029763
PCT Pub. Date: Feb. 15, 2018

(65) Prior Publication Data
US 2019/0383535 A1    Dec. 19, 2019

(51) Int. Cl.
*F25B 47/02*    (2006.01)
(52) U.S. Cl.
CPC .... *F25B 47/025* (2013.01); *F25B 2600/0253* (2013.01); *F25B 2700/1931* (2013.01);
(Continued)
(58) Field of Classification Search
CPC ............ F25B 47/025; F25B 2600/0253; F25B 2700/1931; F25B 2700/1933;
(Continued)

(56) References Cited

U.S. PATENT DOCUMENTS 4,901,534 A * 2/1990 Nakatsuno ............ F25B 47/022
                                                                  62/81
5,369,958 A * 12/1994 Kasai ...................... F24F 3/065
                                                                  62/158
(Continued)

FOREIGN PATENT DOCUMENTS

EP    2 420 767 A2    2/2012
JP    S60-159566 A    8/1985
(Continued)

OTHER PUBLICATIONS

International Search Report of the International Searching Authority dated Oct. 25, 2016 for the corresponding International application No. PCT/JP2016/073352 (and English translation).

*Primary Examiner* — Kun Kai Ma
(74) *Attorney, Agent, or Firm* — Posz Law Group, PLC (57) ABSTRACT

An air-conditioning apparatus includes: a refrigerant circuit in which a compressor, a four-way valve, a heat source-side heat exchanger, an expansion valve and a load-side heat exchanger are connected; and a controller which controls a refrigeration cycle in which refrigerant is circulated in the refrigerant circuit, to switch a flow passage for the refrigerant in accordance with which of a cooling operation, a heating operation and a defrosting operation is performed. The controller includes: a refrigeration-cycle control unit which controls the four-way valve to switch the flow passage of the refrigerant when the operation to be performed is switched from the heating operation to the defrosting operation; and a compressor control unit which sets an operation frequency of the compressor at a value lower than an operation frequency which is applied during the heating operation, when the operation is switched from the heating operation to the defrosting operation.

2 Claims, 4 Drawing Sheets (52) U.S. Cl.
CPC ............... *F25B 2700/1933* (2013.01); *F25B 2700/2105* (2013.01); *F25B 2700/21152* (2013.01)

(58) Field of Classification Search
CPC .... F25B 2700/2105; F25B 2700/21153; F25B 2313/02333; F25B 13/00; F25B 49/022; F25B 2313/0315
See application file for complete search history.

(56) References Cited

U.S. PATENT DOCUMENTS

| | | | | |
|---|---|---|---|---|
| 2004/0040339 | A1* | 3/2004 | Matsumoto | F04C 18/3564 62/470 |
| 2009/0260376 | A1* | 10/2009 | Kasahara | F25B 49/005 62/149 |
| 2018/0283746 | A1* | 10/2018 | Ishiyama | F25B 43/02 |
| 2019/0346182 | A1* | 11/2019 | Ishiyama | F25B 1/00 |

FOREIGN PATENT DOCUMENTS

| | | |
|---|---|---|
| JP | S62-200144 A | 9/1987 |
| JP | H05-6103 B2 | 1/1993 |
| JP | H06-129717 A | 5/1994 |
| JP | H07-9331 B2 | 2/1995 |
| JP | H07-52031 B2 | 6/1995 |
| JP | H07-139857 A | 6/1995 |
| JP | 2523534 B2 | 8/1996 |
| JP | 2528846 B2 | 8/1996 |
| JP | 2720114 B2 | 2/1998 |
| JP | 2012-007800 A | 1/2012 |
| JP | 2014-119122 A | 6/2014 |
| JP | 2015-087071 A | 5/2015 |

* cited by examiner

AIR-CONDITIONING APPARATUS

CROSS REFERENCE TO RELATED APPLICATION

This application is a U.S. national stage application of PCT/JP2016/073352 filed on Aug. 8, 2016, the contents of which are incorporated herein by reference.

TECHNICAL FIELD

The present invention relates to an air-conditioning apparatus having a defrosting function of removing frost adhering to a heat exchanger.

BACKGROUND ART

With regard to a related-art air-conditioning apparatus, Patent Literature 1 discloses an example of a defrosting method for a heat exchanger. In the configuration of the air-conditioning apparatus disclosed in Patent Literature 1, a compressor which compresses refrigerant into high-temperature high-pressure gas, a four-way valve which switches the flow of refrigerant, an indoor-side heat exchanger, an expansion valve functioning as a decompressing unit and an outdoor-side heat exchanger are connected by refrigerant pipes. Furthermore, a bypass pipe passage is provided to connect a portion between the expansion valve and the outdoor-side heat exchanger to a discharge side of the compressor, and an opening/closing valve is provided at the bypass pipe passage.

Next, the operation of the air-conditioning apparatus of Patent Literature 1 will be described. During a heating operation, high-temperature, high-pressure refrigerant discharged from the compressor is caused to flow into the indoor-side heat exchanger by the four-way valve, and is condensed in the indoor-side heat exchanger. In the indoor-side heat exchanger, gas refrigerant is cooled to change into condensed liquid. The condensed liquid is adiabatically expanded at the expansion valve to change into low-pressure refrigerant. The low-pressure refrigerant is heated and evaporated in the outdoor-side heat exchanger to change into low-pressure gas. The low-pressure gas passes through the four-way valve and is sucked into the compressor.

When the amount of heat removed from the outdoor-side heat exchanger to the refrigerant circuit is reduced as an outdoor temperature drops, and an evaporation temperature drops to be lower than or equal to the zero temperature, frost starts to form on the outdoor-side heat exchanger. Thereby, when the function of removing heat is deteriorated, and an input-pipe temperature of the outdoor-side heat exchanger further drops, the air-conditioning apparatus starts a defrosting operation. During the defrosting operation, the opening/closing valve provided at the bypass pipe passage is opened. Thus, after flowing out of the compressor, high-temperature, high-pressure gas passes through the bypass pipe passage, enters the outdoor-side heat exchanger, and melts the frost adhering to the surface of the outdoor-side heat exchanger. This is a hot-gas defrosting operation. After the defrosting operation is ended, the opening/closing valve is closed, and the operation of the air-conditioning apparatus is changed back to the heating operation.

The air-conditioning apparatus disclosed in Patent Literature 1 is of a hot-gas defrosting type. Thus, liquid backflow, which is a phenomenon in which liquid refrigerant condensed in the outdoor-side heat exchanger during the defrosting returns to the compressor, often occurs, and as a result the inner temperature of the compressor drops. In particular, in the case where the inside of the compressor is of a low-pressure shell type, a large amount of refrigerant is dissolved in refrigerating machine oil for lubrication of the inside of the compressor. As a result, the viscosity of the refrigerating machine oil is reduced to cause insufficient lubrication. Thus, the reliability of a bearing of the compressor is also reduced.

An example of a measure for reducing the liquid backflow is disclosed in Patent Literature 2. In a method disclosed in Patent Literature 2, a bypass circuit which connects a refrigerant-outlet side of an outdoor-side heat exchanger during a defrosting operation and a suction port of a compressor to each other, and a heater and a capillary tube provided at the bypass circuit are provided in the air-conditioning apparatus, and when the amount of liquid refrigerant returning to the compressor is large, the heater heats the capillary tube to gasify the refrigerant. In the method disclosed in Patent Literature 2, it is necessary to provide the bypass circuit, the capillary tube and the heater, thus increasing the cost. In methods disclosed in Patent Literature 3 and Patent Literature 4, a bypass circuit which connects a discharge port of a compressor and an outdoor heat exchanger is provided, and the operation frequency of the compressor is increased in stages from the start of a defrosting operation. Also, in the methods disclosed in Patent Literature 3 and Patent Literature 4, it is necessary to provide the bypass circuit, thus increasing the cost.

As another measure for restricting the liquid backflow, Patent Literature 5 discloses a method in which a sensor for detecting a suction temperature at a compressor is provided, and when a suction pressure (temperature) is reduced, the operation frequency of the compressor is reduced. Patent Literatures 6 and 7 disclose methods in which when a defrosting operation is performed, the opening degree of an expansion valve provided between an indoor heat exchanger and an outdoor heat exchanger is controlled such that the degree of superheat of gas discharged from a compressor falls within a predetermined range. Patent Literature 8 discloses that after the operation to be performed is switched from a heating operation to a defrosting operation, the operation frequency of a compressor is increased when the temperature of refrigerating machine oil in the compressor becomes higher than or equal to a predetermined value, whereas the operation frequency of the compressor is reduced when the temperature of the refrigerating machine oil falls below the predetermined value.

CITATION LIST

Patent Literature

Patent Literature 1: Japanese Patent No. 2528846
Patent Literature 2: Japanese Unexamined Patent Application Publication No. Sho 62-200144
Patent Literature 3: Japanese Examined Patent Application Publication No. Hei 07-9331
Patent Literature 4: Japanese Examined Patent Application Publication No. Hei 07-52031
Patent Literature 5: Japanese Examined Patent Application Publication No. Hei 05-6103
Patent Literature 6: Japanese Patent No. 2523534
Patent Literature 7: Japanese Patent No. 2720114
Patent Literature 8: Japanese Unexamined Patent Application Publication No. Hei 07-139857

SUMMARY OF INVENTION

Technical Problem

In the method disclosed in Patent Literature 5, when the liquid backflow occurs and the temperature of the refrigerant reaches a saturation temperature, the degree of the liquid backflow cannot be accurately detected. In the methods disclosed in Patent Literature 6 and Patent Literature 7, in the case where the compressor is of a high-pressure shell type, the amount of the liquid backflow and the degree of superheat of the discharged gas can be correlated; however, in the case where it is of a low-pressure shell type, the amount of the liquid backflow and the degree of superheat of the discharge gas cannot be easily correlated. In the method disclosed in Patent Literature 8, when the temperature of the refrigerating machine oil in the compressor falls below a predetermined value; the operation frequency of the compressor is reduced. However, with respect to the liquid backflow to the compressor which occurs immediately after the start of the defrosting operation, the speed at which the refrigerating machine oil temperature in the compressor drops is reduced because of the heat capacity of the compressor, and as a result detection of the liquid backflow state is delayed. In this case, liquid backflow in which the liquid refrigerant enters the compressor may occur immediately after the start of the defrosting operation.

The present invention has been made to solve the above problems, and provides an air-conditioning apparatus which can restrict liquid backflow to a compressor during a defrosting operation, and ensure reliability of a compressor.

Solution to Problem

An air-conditioning apparatus according to an embodiment of the present invention includes: a refrigerant circuit in which a compressor, a four-way valve, a heat source-side heat exchanger, an expansion valve and a load-side heat exchanger are connected; and a controller which controls a refrigeration cycle in which refrigerant is circulated in the refrigerant circuit, to switch a flow passage for the refrigerant in accordance with which of a cooling operation, a heating operation and a defrosting operation is performed. The controller includes: a refrigeration-cycle control unit which controls the four-way valve to switch the flow passage for the refrigerant when the operation to be performed is switched from the heating operation to the defrosting operation; and a compressor control unit which sets an operation frequency of the compressor at a value lower than an operation frequency which is applied during the heating operation, when the operation is switched from the heating operation to the defrosting operation.

Advantageous Effects of Invention

According to an embodiment of the present invention, when the operation to be performed is switched from the heating operation to the defrosting operation, the operation frequency of the compressor is set at a value lower than the operation frequency which is applied during the heating operation. Therefore, it is possible to reduce lowering of the viscosity of the refrigerating machine oil in the compressor which is caused by the liquid backflow to the compressor immediately after the start of the defrosting operation, whereby the reliability of the compressor can be ensured.

DESCRIPTION OF EMBODIMENTS

Embodiment 1

Figure 1:
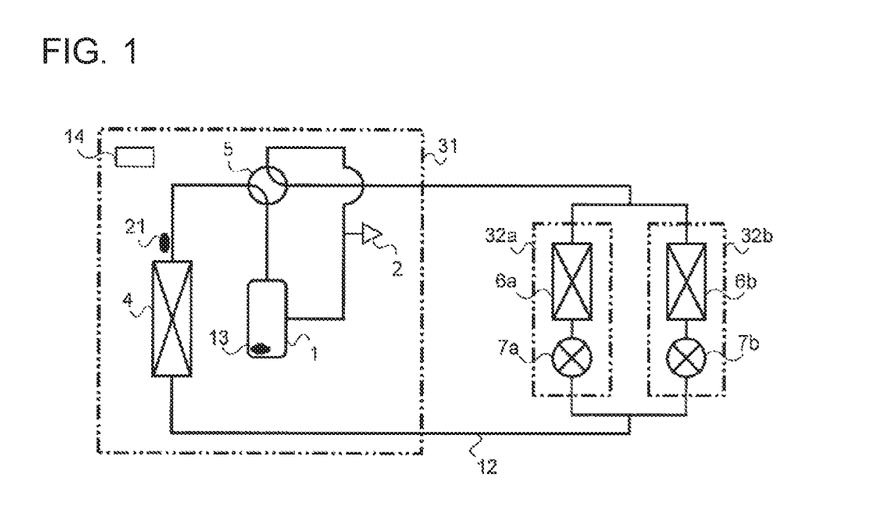
FIG. 1 is a refrigerant circuit diagram illustrating an example of the configuration of an air-conditioning apparatus according to embodiment 1 of the present invention.

The configuration of an air-conditioning apparatus according to embodiment 1 will be described. FIG. 1 is a refrigerant circuit diagram illustrating an example of the configuration of the air-conditioning apparatus according to embodiment 1 of the present invention. As illustrated in FIG. 1, the air-conditioning apparatus includes an outdoor unit 31 and indoor units 32a and 32b. The outdoor unit 31 includes a compressor 1, a four-way valve 5 and a heat source-side heat exchanger 4. The indoor unit 32a includes a load-side heat exchanger 6a and an expansion valve 7a. The indoor unit 32b includes a load-side heat exchanger 6b and an expansion valve 7b. The compressor 1, the four-way valve 5, the heat source-side heat exchanger 4, the load-side heat exchangers 6a and 6b and the expansion valves 7a and 7b are connected by refrigerant pipes 12, whereby a refrigerant circuit is formed.

In the refrigerant circuit as illustrated in FIG. 1, when the air-conditioning apparatus is in a cooling operation, refrigerant discharged from a discharge port of the compressor 1 passes through the four-way valve 5, the heat source-side heat exchanger 4, the expansion valves 7a and 7b, the load-side heat exchangers 6a and 6b and the four-way valve 5, and then returns to an suction port of the compressor 1. During the cooling operation, the heat source-side heat exchanger 4 functions as a condenser, and the load-side heat exchangers 6a and 6b each function as an evaporator. By contrast, when the air-conditioning apparatus is in a heating operation, refrigerant discharged from the discharge port of the compressor 1 passes through the four-way valve 5, the load-side heat exchangers 6a and 6b, the expansion valves 7a and 7b, the heat source-side heat exchanger 4 and the four-way valve 5, and then returns to the suction port of the compressor 1. During the heating operation, the heat source-side heat exchanger 4 functions as an evaporator, and the load-side heat exchangers 6a and 6b each function as a condenser.

In the outdoor unit 31, a suction pressure sensor 2 is provided at part of the refrigerant pipe 12 that is located between the four-way valve 5 and the compressor 1, to detect a suction pressure at the compressor 1. An oil temperature sensor 13 is provided at the compressor 1 to detect a temperature of refrigerating machine oil for lubrication of the inside of the compressor 1. A defrosting condition detector 21 is provided at part of the refrigerant pipe 12 that is located close to a side of the heat source-side heat exchanger 4 that is connected to the four-way valve 5. The defrosting condition detector 21 outputs an on-signal when a temperature at part of the refrigerant pipe 12 that is located at the heat source-side heat exchanger 4 falls below a predetermined value. Furthermore, a controller 14 is provided in the outdoor unit 31 to control a refrigeration cycle in which the refrigerant is circulated in the refrigerant circuit.

Figure 2:
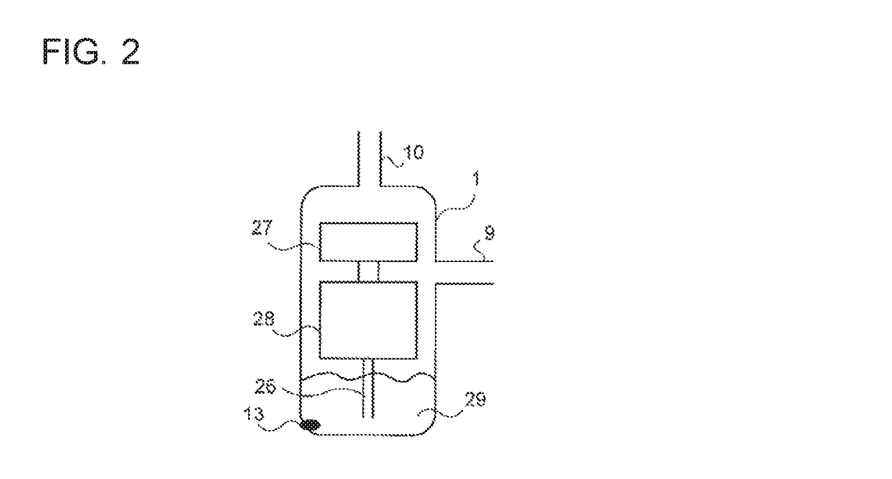
FIG. 2 is a schematic sectional view illustrating an example of the configuration of a compressor as illustrated in FIG. 1.

The configuration of the compressor 1 as illustrated in FIG. 1 will be described. FIG. 2 is a schematic sectional view illustrating an example of the configuration of the compressor as illustrated in FIG. 1. The following description is made by referring to by way of example the case where the compressor 1 is a scroll compressor. As illustrated in FIG. 2, the compressor 1 includes a compression unit 27 and a motor 28. The compression unit 27 includes a spiral fixed blade and a spiral movable blade which are provided to compress the refrigerant. The motor 28 is provided to rotate the movable blade. At an upper portion of the casing of the compressor 1, a discharge pipe 10 is provided as a discharge port for the refrigerant. A suction pipe 9 is provided at part of a side surface of the casing of the compressor 1, that corresponds to a lower region located under the compression unit 27, and serves as a suction port for the refrigerant. The suction pipe 9 and the discharge pipe 10 are connected to the refrigerant pipes 12 as illustrated in FIG. 1. Refrigerating machine oil 29, which serves as lubrication oil for smooth rotation of a shaft of the motor 28, is stored in a bottom portion of the casing of the compressor 1. The refrigerating machine oil 29 is fed by an oil pump 26 to the compression unit 27 and the motor 28. The oil temperature sensor 13 is attached to an outer side of the bottom portion of the casing of the compressor 1, and detects the temperature of the refrigerating machine oil 29.

Figure 3A:
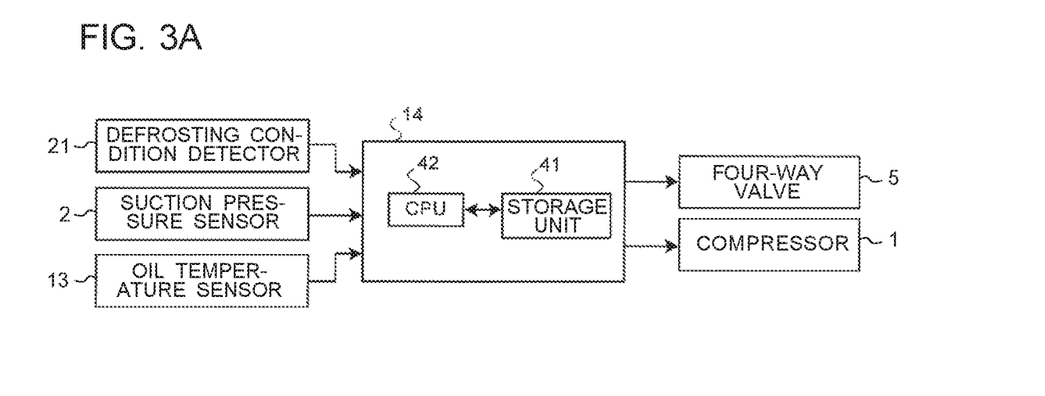
FIG. 3A is a block diagram illustrating components connected to a controller by signal lines in the air-conditioning apparatus as illustrated in FIG. 1.
Figure 3B:
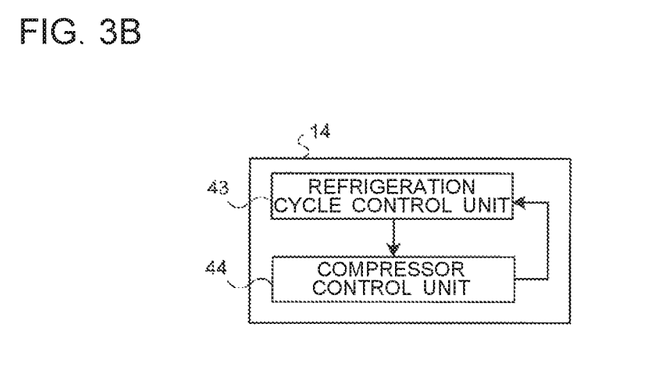
FIG. 3B is a block diagram illustrating an example of the configuration of the controller as illustrated in FIG. 1.

FIG. 3A is a block diagram illustrating components connected to the controller by signal lines in the air-conditioning apparatus as illustrated in FIG. 1. FIG. 3B is a block diagram illustrating an example of the configuration of the controller as illustrated in FIG. 1. As illustrated in FIG. 3A, the controller 14 is connected to the defrosting condition detector 21, the suction pressure sensor 2, the oil temperature sensor 13, the four-way valve 5 and the compressor 1 by signal lines. The controller 14 includes a storage unit 41 and a central processing unit (CPU) 42. The storage unit 41 stores a program. The CPU 42 executes processing in accordance with the program. The storage unit 41 includes, for example, a non-volatile memory. As illustrated in FIG. 3B, the controller 14 includes a refrigeration-cycle control unit 43 and a compressor control unit 44. The refrigeration-cycle control unit 43 switches a flow passage for the refrigerant in accordance with an operation state, that is, which of a cooling operation, a heating operation and a defrosting operation is performed. The compressor control unit 44 controls the operation frequency of the compressor 1 during the defrosting operation. When the CPU 42 as illustrated in FIG. 3A executes the program, the refrigeration-cycle control unit 43 and the compressor control unit 44 as illustrated in FIG. 3B are configured in the air-conditioning apparatus.

The refrigeration-cycle control unit 43 controls the four-way valve 5 to switch the flow passage for the refrigerant in accordance with whether the operation is the heating operation or the cooling operation. When a defrosting condition is satisfied, and the refrigeration-cycle control unit 43 receives an on-signal from the defrosting condition detector 21 during the heating operation, the refrigeration-cycle control unit 43 controls the four-way valve 5 to switch the flow passage for the refrigerant, and notifies the compressor control unit 44 that the operation is switched from the heating operation to the defrosting operation. The flow passage for the refrigerant during the defrosting operation is the same as that during the cooling operation. When the compressor control unit 44 notifies the refrigeration-cycle control unit 43 that the defrosting operation is ended, the refrigeration-cycle control unit 43 controls the four-way valve 5 to switch the flow passage for the refrigerant to return the operation from the defrosting operation to the heating operation.

During the defrosting operation, the compressor control unit 44 controls the compressor 1 to operate with an operation frequency which is set higher than during the heating operation. The operation frequency set in this case will be referred to as defrosting operation frequency. When the refrigeration-cycle control unit 43 notifies the compressor control unit 44 that the operation is switched to the defrosting operation, the compressor control unit 44 does not immediately set the operation frequency of the compressor 1 to the defrosting operation frequency, but sets the operation frequency of the compressor 1 to an operation frequency lower than the defrosting operation frequency. The operation frequency set in this case will be referred to as defrosting start-time operation frequency. In embodiment 1, the defrosting start-time operation frequency is an operation frequency lower than during the heating operation. The defrosting start-time operation frequency is applied in order that defrosting be performed at the same time as liquid backflow is reduced, prior to application of the defrosting operation frequency which is applied in order that defrosting be more efficiently performed.

Furthermore, until a predetermined time period t0 elapses from the start of the defrosting operation, the compressor control unit 44 keeps the operation frequency set to the compressor 1 at the defrosting start-time operation frequency. After elapse of the predetermined time period t0 from the start of the defrosting operation, the compressor control unit 44 calculates as the degree of superheat of the refrigerating machine oil 29, a difference between a temperature of the refrigerating machine oil 29 that is detected by the oil temperature sensor 13 and a refrigerant saturation temperature corresponding to a suction pressure detected by the suction pressure sensor 2, that is, an evaporation temperature. Then, the compressor control unit 44 determines the operation frequency to be set to the compressor 1, in accordance with the degree of superheat of the refrigerating machine oil 29. To be more specific, the compressor control unit 44 compares the degree of superheat of the refrigerating machine oil 29 with a predetermined first threshold value. When the degree of superheat of the refrigerating machine oil 29 is greater than or equal to the first threshold value, the compressor control unit 44 increases the operation frequency of the compressor 1 to the defrosting operation frequency. In contrast, when the degree of superheat of the refrigerating machine oil 29 is smaller than the first threshold value, the compressor control unit 44 keeps the operation frequency of the compressor 1 at the defrosting start-time operation frequency. In order to set the operation frequency to the compressor 1, the compressor control unit 44 transmits a control signal including information on the operation frequency to the compressor 1 through a signal line.

Furthermore, when it is determined that defrosting of the heat source-side heat exchanger 4 is ended, the compressor control unit 44 notifies the refrigeration-cycle control unit 43 that the defrosting is ended. For example, when the temperature at part of the refrigerant pipe 12 which is located at the heat source-side heat exchanger 4 becomes higher than a predetermined value, the defrosting condition detector 21 switches the signal to be output to the controller 14 from an on-signal to an off-signal. In this case, the compressor control unit 44 determines that defrosting of the heat source-side heat exchanger 4 is ended, upon of switching of the signal received from the defrosting condition detector 21, from the on-signal to the off-signal.

Although FIG. 1 illustrates the case where two indoor units are provided, the number of indoor units is not limited to two. One indoor unit may be provided, or three or more indoor units may be provided. Furthermore, although FIG. 1 illustrates the case where the controller 14 is provided in the outdoor unit 31, the controller 14 may be provided in either the indoor unit 32a or the indoor unit 32b. Also, the controller 14 may also be provided in another place as long as the place is located in a building in which the outdoor unit 31 and the indoor units 32a and 32b are installed. With respect to embodiment 1, the above description is made by referring to the case in which the compressor 1 is a scroll compressor. However, the compressor 1 is not limited to the scroll compressor.

Figure 4:
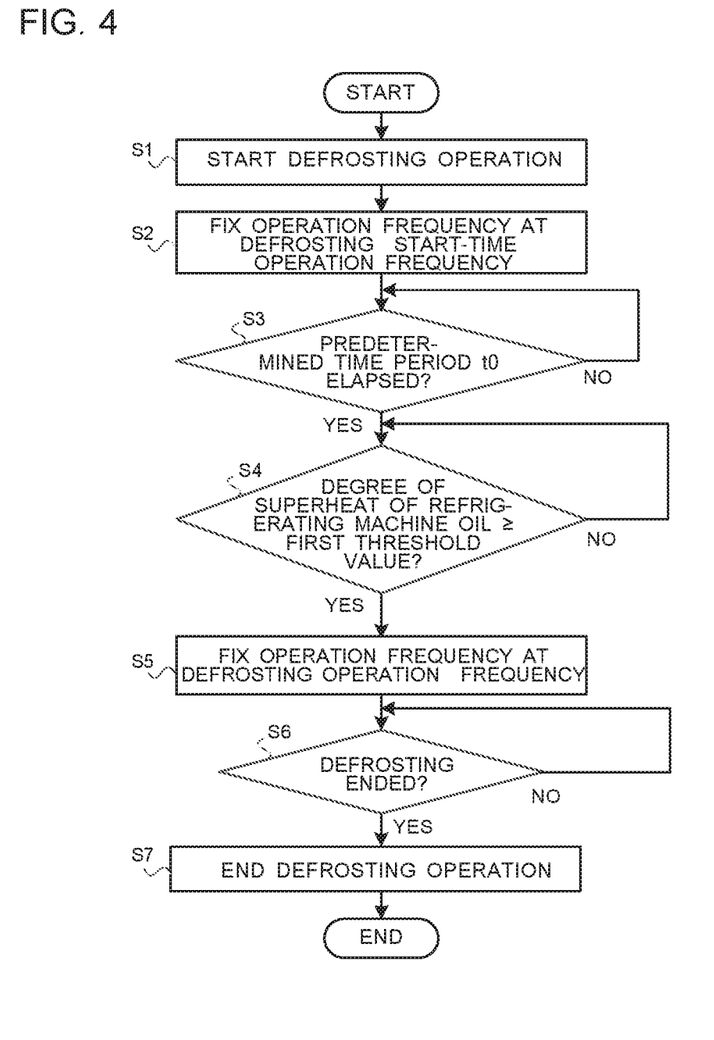
FIG. 4 is a flowchart indicating an operation of the air-conditioning apparatus according to embodiment 1 of the present invention.
Figure 5:
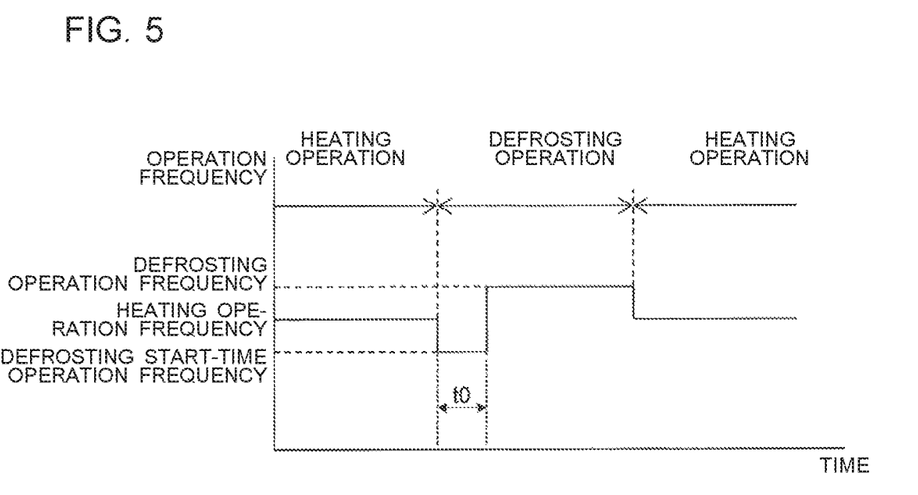
FIG. 5 is a graph indicating an example of a change in the operation frequency of the compressor during a defrosting operation in the air-conditioning apparatus as illustrated in FIG. 1.

Next, an operation of the air-conditioning apparatus according to embodiment 1 will be described, FIG. 4 is a flowchart illustrating the operation of the air-conditioning apparatus according to embodiment 1 of the present invention. FIG. 5 is a graph indicating an example of a change in the operation frequency of the compressor during the defrosting operation in the air-conditioning apparatus as illustrated in FIG. 1. In the graph indicated in FIG. 5, the horizontal axis represents time, and the vertical axis represents the operation frequency to be set to the compressor 1.

As illustrated in FIG. 4, first, in step S1, the controller 14 controls the four-way valve 5 to switch the flow passage for the refrigerant, and thereby starts the defrosting operation. Then, the operation frequency of the compressor 1 is set to the defrosting start-time operation frequency and fixed at the defrosting start-time operation frequency (step S2), As indicated in FIG. 5, the defrosting start-time operation frequency is lower than a heating time operation frequency and the defrosting operation frequency. Referring to FIG. 5, before the operation frequency of the compressor 1 is increased from the heating time operation frequency to the defrosting operation frequency, the operation frequency is temporarily reduced at the defrosting start-time operation frequency. In a shift from heating to high-efficient defrosting, the defrosting start-time operation frequency is applied between the heating and the high-efficient defrosting.

Then, an example of a method of determining the defrosting start-time operation frequency will be described. First, an experiment is conducted to bring about the following conditions: the refrigerant is dissolved into the refrigerating machine oil 29 in the compressor by liquid backflow to the compressor 1, the amount of refrigerant dissolved into the refrigerating machine oil 29 (degree of dissolution of refrigerant) is increased, and the level of the refrigerating machine oil 29 is increased such that the motor 28 is soaked therein. Then, the operation frequency at which even under the above conditions, transferring of the refrigerating machine oil 29 from the compressor 1 into the refrigerant circuit by high-speed rotation of the motor 28 is reduced is found. The found operation frequency is set as the defrosting start-time operation frequency. The defrosting start-time operation frequency found and set in the above manner is set as the operation frequency of the compressor 1 which is to be set immediately after the start of the defrosting operation. Thereby, the degree of transferring of the refrigerating machine oil 29 from the compressor 1 which is caused by the liquid backflow immediately after the start of the defrosting, can be reduced, and the degree of dissolution of the refrigerant in the compressor can be reduced by generation of heat from the motor 28 of the compressor 1. As a result, the reliability of the compressor 1 is improved.

However, since it is difficult to ensure a defrosting performance in a short time period with the above defrosting start-time operation frequency, there is a possibility that during the defrosting operation, a room temperature, that is, the temperature of space to be air-conditioned by the indoor units 32a and 32b, will remarkably drop. Therefore, when the controller 14 determines in step S4 indicated in FIG. 4 whether liquid backflow to the compressor 1 occurs or not, and then determines that the liquid backflow does not occur, it increases the operation frequency to be set to the compressor 1 to the defrosting operation frequency to improve the defrosting performance. However, with respect to the liquid backflow to the compressor 1 immediately after the start of the defrosting, the speed of dropping of the temperature of the refrigerating machine oil 29 is reduced because of the heat capacity of the compressor 1, and detection of the liquid backflow is delayed. Therefore, as illustrated in FIG. 4, in step S3, the controller 14 continues the operation of the compressor 1 at the defrosting start-time operation frequency for the time period t0 until the suction pressure at the compressor 1 and the temperature of the refrigerating machine oil 29 during the defrosting operation are stabilized. Thereby, transferring of the refrigerating machine oil 29 from the compressor 1 to the refrigerant circuit is reduced, and restoration of the viscosity of the refrigerating machine oil 29 in the compressor is promoted. In addition, the temperature of the refrigerating machine oil 29 and the suction pressure at the compressor 1 immediately after the start of the defrosting operation can be detected with a higher accuracy.

Figure 6:
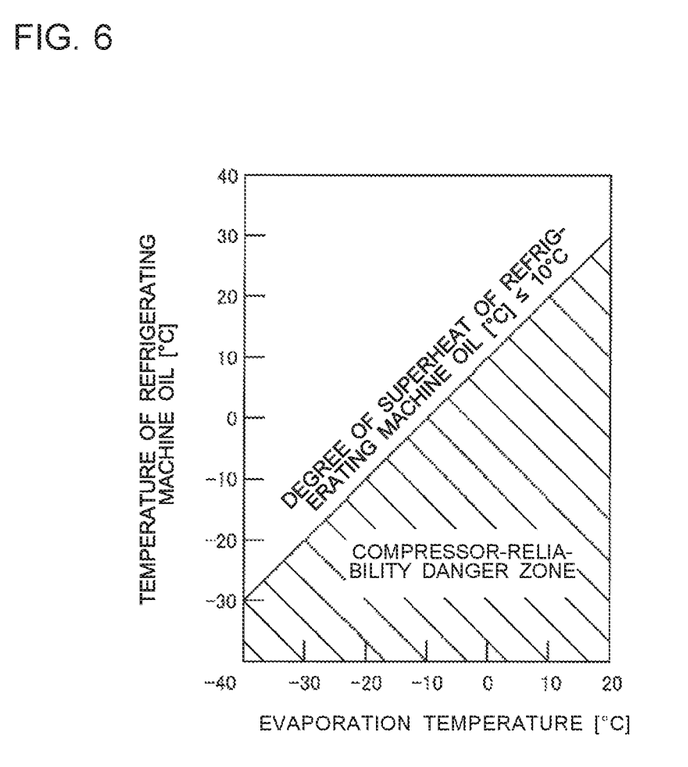
FIG. 6 is a graph indicating a compressor-reliability danger zone of the degree of superheat of refrigerating machine oil in the compressor as illustrated in FIG. 2.

After elapse of the time period t0 from the start of the defrosting operation, in step S4, the controller 14 calculates the degree of superheat of the refrigerating machine oil 29 based on a detection value obtained by detection by the suction pressure sensor 2 and a detection value obtained by detection by the oil temperature sensor 13, and compares the calculated degree of superheat with the first threshold value. Now, a specific example of the first threshold value will be described. FIG. 6 is a graph indicating a compressor-reliability danger zone of the degree of superheat of the refrigerating machine oil in the compressor as illustrated in FIG. 2. In the graph indicated in FIG. 6, the horizontal axis represents the evaporation temperature, and the vertical axis represents the temperature of the refrigerating machine oil 29. The evaporation temperature is determined based on the refrigerant saturation temperature corresponding to the suction pressure detected by the suction pressure sensor 2.

The straight line of the linear function indicated in the graph of FIG. 6 represents a limit value indicating that when the degree of superheat of the refrigerating machine oil 29 falls below the straight line, the reliability of the compressor 1 falls into a danger zone. An upper zone including the straight line of the linear function means a zone in which the degree of superheat of the refrigerating machine oil 29 is higher than or equal to 10 degrees Celsius. That is, the straight line of the linear function indicated in FIG. 6 represents a border line between the danger zone and safety zone for the reliability of the compressor 1 in terms of the degree of superheat of the refrigerating machine oil 29. In the example as indicated in FIG. 6, the first threshold value is set at 10 degrees Celsius, which is a limit value of the compressor-reliability danger zone; however, the first threshold value is determined in accordance with the properties of the refrigerant and the refrigerating machine oil. In general, the viscosity of the refrigerating machine oil in the compressor is higher than that of the refrigerant. Thus, when the liquid refrigerant flows into the compressor because of the liquid backflow, and the refrigerant is dissolved into the refrigerating machine oil, the degree of superheat of the refrigerating machine oil is reduced. When the degree of dissolution of the refrigerant in the refrigerating machine oil is increased, the viscosity of the refrigerating machine oil is reduced. Since the viscosity of the refrigerating machine oil to be supplied to a bearing in the compressor is reduced, lubrication of the bearing is also reduced to be insufficient, and the reliability of the compressor is thus lowered.

In step S4, when the degree of superheat of the refrigerating machine oil 29 is higher than or equal to the first threshold value, the controller 14 can determine that the liquid backflow to the compressor 1 does not occur or that the liquid backflow is eliminated. In this case, the controller 14 proceeds to the process of step S5, increases the operation frequency of the compressor 1 to the defrosting operation frequency, and fixes the operation frequency at the defrosting operation frequency. Thereby, the defrosting performance can be improved. FIG. 5 illustrates the case where when the time period t0 elapses from the start of the defrosting operation, as the result of the determination in step S4, the controller 14 increases the operation frequency of the compressor 1 to the defrosting operation frequency. In contrast, as the result of the determination in step S4, in the case where the degree of superheat of the refrigerating machine oil 29 is lower than the first threshold value, the controller 14 keeps the operation frequency of the compressor 1 at the defrosting start-time operation frequency, and the process returns to the process of step S4.

Thereafter, the controller 14 continues the operation with the defrosting operation frequency with respect to the compressor 1. When it is determined that the defrosting is ended (step S6), the controller 14 changes the state of the four-way valve 5 back to the original state to which the four-way valve 5 is set during the heating operation, and ends the defrosting operation (step S7).

As described above, by changing the operation frequency of the compressor 1 in accordance with the degree of superheat of the refrigerating machine oil 29 in the compressor 1 during the defrosting operation, it is possible to perform the defrosting operation with a high efficiency, while ensuring the reliability of the compressor 1 without increasing the manufacturing cost of the air-conditioning apparatus.

The air-conditioning apparatus according to embodiment 1 includes: the refrigerant circuit in which the compressor 1, the four-way valve 5, the heat source-side heat exchanger 4, the expansion valve 7a, and the load-side heat exchanger 6a are connected; and the controller 14 which switches the flow passage for the refrigerant in accordance with the operation state, that is, which of the cooling operation, the heating operation and the defrosting operation is performed. The controller 14 includes: the refrigeration-cycle control unit 43 which controls the four-way valve 5 to switch the flow passage for the refrigerant when the operation is switched from the heating operation to the defrosting operation; and the compressor control unit 44 which sets the operation frequency of the compressor 1 at a value lower than an operation frequency which is applied during the heating operation, when the operation is switched from the heating operation to the defrosting operation.

In embodiment 1, when the operation is switched from the heating operation to the defrosting operation, the operation frequency of the compressor 1 is set at a value lower than the operation frequency which is applied during the heating operation. Therefore, even without detection of whether liquid backflow occurs or not, it is possible to reduce lowering of the viscosity of the refrigerating machine oil 29 in the compressor, which would be caused by the liquid backflow to the compressor 1 immediately after the start of the defrosting operation, and also reduce transferring of the refrigerating machine oil 29 from the compressor 1 to the refrigerant circuit. As a result, the reliability of the compressor 1 can be ensured without increasing the manufacturing cost of the air-conditioning apparatus.

In embodiment 1, the compressor control unit 44 may keep the operation frequency of the compressor 1 at a value lower than the operation frequency which is applied during the heating operation, until a predetermined time period elapses from the start of the defrosting operation. In this case, until the predetermined time period elapses from the start of the defrosting operation, transferring of the refrigeration oil 29 from the compressor 1 to the refrigerant circuit can be reduced, and the restoration of the viscosity of the refrigerating machine oil 29 in the compressor can be promoted. It is therefore possible to ensure the reliability of the compressor 1 without increasing the manufacturing cost of the air-conditioning apparatus.

In embodiment 1, the oil temperature sensor 13 which detects the temperature of the refrigerating machine oil 29 in the compressor and the suction pressure sensor 2 which detects the pressure of gas to be sucked into the compressor 1 are further provided. After elapse of a predetermined time period, when the degree of superheat of the refrigerating machine oil 29 which is determined based on the detection value obtained by the oil temperature sensor 13 and the detection value obtained by the suction pressure sensor 2 is higher than or equal to the predetermined first threshold value, the compressor control unit 44 may increase the operation frequency of the compressor 1 to the defrosting operation frequency. In this case, after the elapse of the predetermined time period from the start of the defrosting operation, the compressor control unit 44 determines the degree of superheat of the refrigerating machine oil 29 based on the detection value of the oil temperature sensor 13 and the detection value of the suction pressure sensor 2. Thus, the pressure and the temperature immediately after the start of the defrosting is prevented from being erroneously detected, and the accuracy of the detection can thus be improved. Furthermore, since during the defrosting operation, the operation frequency of the compressor 1 is increased in accordance with the degree of superheat of the refrigerating machine oil 29 in the compressor 1, it is possible to perform the defrosting operation with a high efficiency, while ensuring the reliability of the compressor 1 without increasing the manufacturing cost of the air-conditioning apparatus.

Embodiment 2

In embodiment 1, as a control parameter for the operation frequency of the compressor 1 during the defrosting operation, the degree of superheat of the refrigerating machine oil 29 is applied. In embodiment 2, as the above control parameter, the degree of superheat of gas discharged from the compressor 1 is applied.

Figure 7:
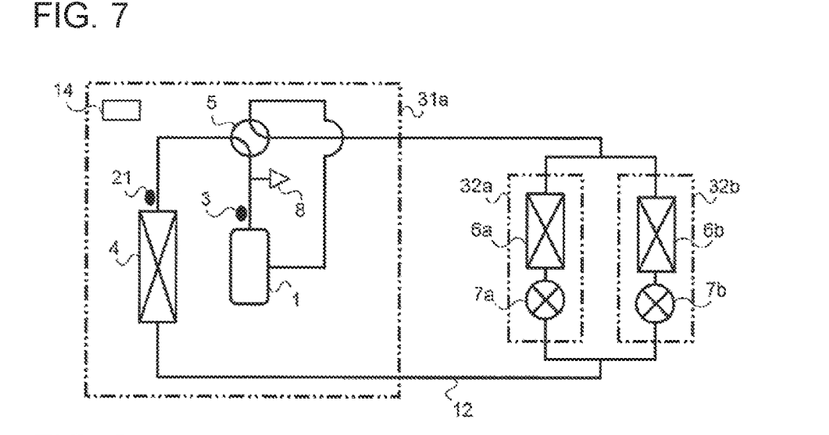
FIG. 7 is a refrigerant circuit diagram illustrating an example of the configuration of an air-conditioning apparatus according to embodiment 2 of the present invention.

A configuration of an air-conditioning apparatus according to embodiment 2 will be described. With respect to embodiment 2, detailed descriptions of components which are the same as or similar to those of embodiment 1 will be omitted. FIG. 7 is a refrigerant circuit diagram indicating an example of the configuration of the air-conditioning apparatus according to embodiment 2 of the present invention. As compared with the configuration of the outdoor unit 31 as illustrated in FIG. 1, the configuration as illustrated in FIG. 7 is different from the configuration of the outdoor unit 31 as illustrated in FIG. 1 on the following points. In an outdoor unit 31a as illustrated in FIG. 7, a discharge temperature sensor 3 which detects a temperature of gas discharged from the compressor 1 is provided at the discharge pipe 10 for the compressor 1. Also, a discharge pressure sensor 8 which detects a pressure of the gas discharged from the compressor 1 is provided at the discharge pipe 10 of the compressor 1. On the other hand, the oil temperature sensor 13 and the suction pressure sensor 2 as illustrated in FIG. 1 are not provided in the outdoor unit 31a.

The controller 14 is connected to the defrosting condition detector 21, the discharge pressure sensor 8, the discharge temperature sensor 3, the four-way valve 5, and the compressor 1 by signal lines. When the time period t0 elapses from the start of the defrosting operation, the compressor control unit 44 calculates a difference between the temperature of the discharged gas which is detected by the discharge temperature sensor 3 and a refrigerant saturation temperature corresponding to the pressure of the discharge gas which is detected by the discharge pressure sensor 8, that is, a condensing temperature, as a degree of superheat of the discharged gas from the compressor 1. Then, the compressor control unit 44 determines the operation frequency to be set to the compressor 1, in accordance with the degree of superheat of the discharged gas. Specifically, the compressor control unit 44 compares the degree of superheat of the discharged gas with a predetermined second threshold value. When the degree of superheat of the discharged gas is greater than or equal to the second threshold value, the compressor control unit 44 increases the operation frequency of the compressor 1 to the defrosting operation frequency. In contrast, when the degree of superheat of the discharged gas is smaller than the second threshold value, the compressor control unit 44 keeps the operation frequency of the compressor 1 at the defrosting start-time operation frequency.

An example of a method of setting the second threshold value will be described. Correlation between the degree of superheat of the refrigerating machine oil 29 and the degree of superheat of the discharged gas from the compressor 1, which are applied in embodiment 1, is verified in advance through, for example, an experiment. Then, based on the result of the experiment, the degree of superheat of the discharged gas from the compressor 1, at which the degree of superheat of the refrigerating machine oil 29 becomes equal to the first threshold value, is set as the second threshold value in advance.

In embodiment 1, the controller 14 determines the operation frequency of the compressor 1 in accordance with the degree of superheat of the refrigerating machine oil 29 in the compressor 1. In embodiment 2, the controller 14 determines the operation frequency of the compressor 1 based on the degree of superheat of the discharged gas from the compressor 1, which is found from the detection value obtained by detection by the discharge temperature sensor 3 of the compressor 1 and the detection value obtained by detection by the discharge pressure sensor 8, not based on the degree of superheat of the refrigerating machine oil 29 in the compressor 1.

Figure 8:
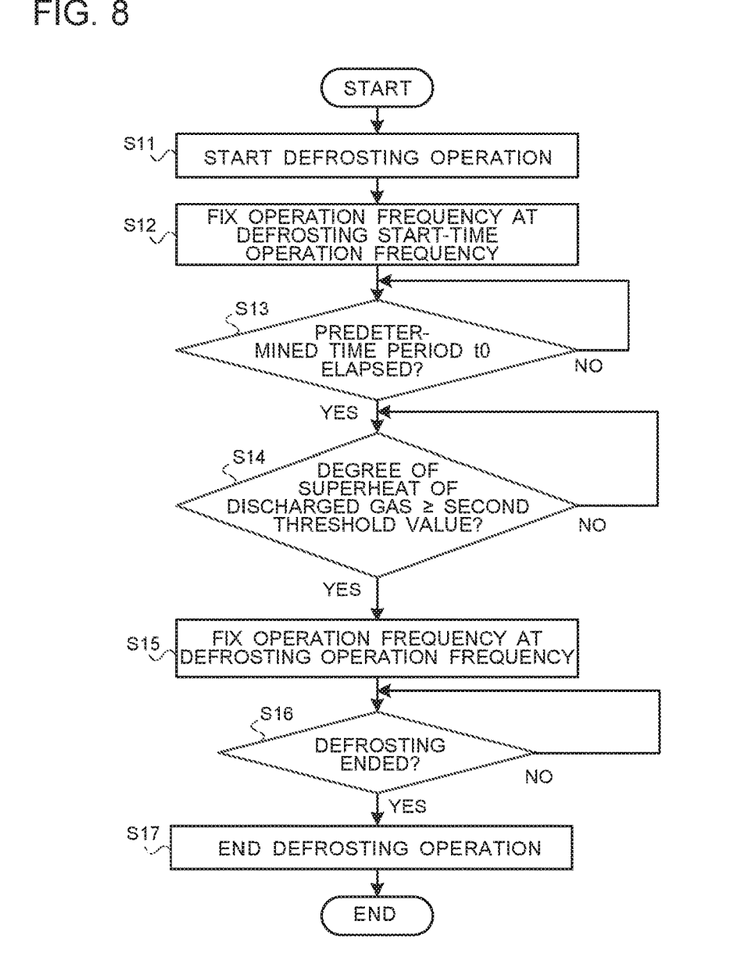
FIG. 8 is a flowchart indicating an operation of the air-conditioning apparatus according to embodiment 2 of the present invention.

Next, an operation of the air-conditioning apparatus according to embodiment 2 will be described with reference to FIG. 8. FIG. 8 is a flowchart indicating the operation of the air-conditioning apparatus according to embodiment 2 of the present invention. Of steps S11 to S17 indicated in FIG. 8, the processes of steps other than step S14 are the same as those of steps S1 to S3 and steps S5 to S7 indicated in FIG. 4, and detailed descriptions of the processes of those steps will thus be omitted.

In step S14 of the flowchart indicated in FIG. 8, the controller 14 determines the degree of superheat of the discharged gas from the compressor 1, and compares the degree of superheat of the discharged gas with the second threshold value. When the degree of superheat of the discharged gas from the compressor 1 is greater than or equal to the second threshold value, the controller 14 can determine that liquid backflow to the compressor 1 does not occur, or the liquid backflow is eliminated. In this case, the controller 14 proceeds to the process of step S15, and increases the operation frequency of the compressor 1 to the defrosting operation frequency. Thereby, the defrosting performance can be improved. In contrast, as the result of the determination in step S14, when the degree of superheat of the discharged gas from the compressor 1 is smaller than the second threshold value, the controller 14 keeps the operation frequency of the compressor 1 at the defrosting start-time operation frequency, and the process returns to the process of step S14.

The air-conditioning apparatus according to embodiment 2 includes the refrigerant circuit, the controller 14, the discharge temperature sensor 3, and the discharge pressure sensor 8. In the refrigerant circuit, the compressor 1, the four-way valve 5, the heat source-side heat exchanger 4, the expansion valve 7a, and the load-side heat exchanger 6a are connected. The controller 14 includes the refrigeration-cycle control unit 43 and the compressor control unit 44. The discharge temperature sensor 3 detects the temperature of the discharged gas from the compressor 1. The discharge pressure sensor 8 detects the pressure of the discharged gas from the compressor 1. When the degree of superheat of the discharged gas from the compressor 1 which is determined based on the detection value obtained by the discharge temperature sensor 3 and the detection value obtained by the discharge pressure sensor 8 is greater than or equal to the predetermined second threshold value, the compressor control unit 44 increases the operation frequency of the compressor 1 to the defrosting operation frequency.

In embodiment 2, the operation frequency of the compressor 1 is controlled in accordance with the degree of superheat of discharged gas from the compressor 1 during the defrosting operation. Therefore, it is possible to perform the defrosting operation with a high efficiency, while ensuring the reliability of the compressor 1 without increasing the manufacturing cost of the air-conditioning apparatus, as in embodiment 1.

REFERENCE SIGNS LIST 1 compressor 2 suction pressure sensor 3 discharge temperature sensor 4 heat source-side heat exchanger 5 four-way valve 6a, 6b load-side heat exchanger 7a, 7b expansion valve 8 discharge pressure sensor 9 suction pipe 10 discharge pipe 12 refrigerant pipe 13 oil temperature sensor 14 controller 21 defrosting condition detector 26 oil pump 27 compression unit 28 motor 29 refrigerating machine oil 31, 31a outdoor unit 32a, 32b indoor unit 41 storage unit 42 CPU 43 refrigeration-cycle control unit 44 compressor control unit

The invention claimed is:

1. An air-conditioning apparatus comprising:
a refrigerant circuit in which a compressor, a four-way valve, a heat source-side heat exchanger, an expansion valve and a load-side heat exchanger are connected;
an oil temperature sensor provided at the compressor, and configured to detect a temperature of refrigerating machine oil in the compressor;
a suction pressure sensor configured to detect a pressure of gas to be sucked into the compressor; and
a controller configured to control a refrigeration cycle in which refrigerant is circulated in the refrigerant circuit, to switch a flow passage for the refrigerant in accordance with which of a cooling operation, a heating operation and a defrosting operation is performed, the controller being further configured to:
control the four-way valve to switch the flow passage for the refrigerant, when an operation to be performed is switched from the heating operation to the defrosting operation;
set an operation frequency of the compressor at a value lower than an operation frequency which is applied during the heating operation, when the operation is switched from the heating operation to the defrosting operation;
keep the operation frequency of the compressor at the value lower than the operation frequency which is applied during the heating operation, until a predetermined time period elapses from a start of the defrosting operation;
compare, after the predetermined time period elapses, a degree of superheat of the refrigerating machine oil, which is determined based on a detection value obtained by the oil temperature sensor and a detection value obtained by the suction pressure sensor, with a predetermined threshold value, and
increase the operation frequency of the compressor to a value higher than the operation frequency which is applied during the heating operation, when the degree of superheat of the refrigerating machine oil is greater than or equal to the threshold value, and keep the operation frequency of the compressor at the value lower than the operation frequency which is applied during the heating operation, when the degree of superheat of the refrigerating machine oil is smaller than the threshold value.

2. An air-conditioning apparatus comprising:
a refrigerant circuit in which a compressor, a four-way valve, a heat source-side heat exchanger, an expansion valve and a load-side heat exchanger are connected;
a discharge temperature sensor configured to detect a temperature of gas discharged from the compressor;
a discharge pressure sensor configured to detect a pressure of the discharged gas from the compressor; and
a controller configured to control a refrigeration cycle in which refrigerant is circulated in the refrigerant circuit, to switch a flow passage for the refrigerant in accordance with which of a cooling operation, a heating operation and a defrosting operation is performed, the controller being further configured to:
control the four-way valve to switch the flow passage for the refrigerant, when an operation to be performed is switched from the heating operation to the defrosting operation;
set an operation frequency of the compressor at a value lower than an operation frequency which is applied during the heating operation, when the operation is switched from the heating operation to the defrosting operation;
keep the operation frequency of the compressor at the value lower than the operation frequency which is applied during the heating operation, until a predetermined time period elapses from a start of the defrosting operation; and
compare a degree of superheat of the discharged gas from the compressor, which is determined based on a detection value obtained by the discharge temperature sensor and a detection value obtained by the discharge pressure sensor, with a predetermined threshold value, after the predetermined time period elapses; increase the operation frequency of the compressor to a value higher than the operation frequency which is applied during the heating operation, when the degree of superheat of the discharged gas is greater than or equal to the threshold value; and keep the operation frequency of the compressor at the value lower than the operation frequency which is applied during the heating operation, when the degree of superheat of the discharged gas is smaller than the threshold value.

* * * * *